(12) United States Patent
Spencer et al.

(10) Patent No.: US 8,457,137 B2
(45) Date of Patent: Jun. 4, 2013

(54) BRANCH EXCHANGE METHODS AND APPARATUSES FOR SWITCHING TELECOMMUNICATION SIGNALS

(76) Inventors: Mark A. Spencer, Madison, AL (US); Michael W. Morris, Huntsville, AL (US)

(*) Notice: Subject to any disclaimer, the term of this patent is extended or adjusted under 35 U.S.C. 154(b) by 306 days.

(21) Appl. No.: 11/585,787

(22) Filed: Oct. 24, 2006

(65) Prior Publication Data

US 2007/0127443 A1 Jun. 7, 2007

Related U.S. Application Data

(60) Provisional application No. 60/729,580, filed on Oct. 24, 2005.

(51) Int. Cl.
*H04L 12/66* (2006.01)
(52) U.S. Cl.
USPC .......................... 370/401; 370/352; 370/234
(58) Field of Classification Search
USPC ......................................... 370/401, 352, 234
See application file for complete search history.

(56) References Cited

U.S. PATENT DOCUMENTS

| | | | |
|---|---|---|---|
| 4,471,169 A * | 9/1984 | Lenk et al. ..................... | 379/253 |
| 4,495,571 A | 1/1985 | Staplin, Jr. et al. | |
| 4,604,682 A | 8/1986 | Schwan et al. | |
| 6,154,465 A * | 11/2000 | Pickett ........................... | 370/466 |
| 6,728,239 B1 | 4/2004 | Kung et al. | |
| 6,795,448 B1 | 9/2004 | Lee et al. | |
| 7,023,867 B1 | 4/2006 | Park et al. | |
| 7,200,855 B2 * | 4/2007 | Laksono ......................... | 725/82 |
| 2003/0185231 A1 | 10/2003 | Dobler | |
| 2003/0223409 A1 * | 12/2003 | Wiebe ............................ | 370/352 |
| 2004/0001481 A1 | 1/2004 | Kamenetsky et al. | |
| 2005/0030941 A1 * | 2/2005 | Lee et al. ....................... | 370/352 |
| 2005/0053078 A1 * | 3/2005 | Blanc et al. .............. | 370/395.72 |

FOREIGN PATENT DOCUMENTS

| | | |
|---|---|---|
| WO | WO-2006-066412 | 6/2006 |
| WO | WO2006066412 | 6/2006 |

* cited by examiner

*Primary Examiner* — Dang Ton
*Assistant Examiner* — Pamit Kaur
(74) *Attorney, Agent, or Firm* — David E. Mixon; Bradley Arant Boult Cummings LLP (57) ABSTRACT

A branch exchange comprises at least one interface module coupled to a plurality of telecommunication connections including a first telecommunication connection and a second telecommunication connection. A converter is coupled to the at least one interface module and a network interface controller (NIC). The converter is configured to communicate at least one time division multiplexed (TDM) data stream between the converter and the at least one interface module. The converter is further configured to packetize data from one of the telecommunication connections into a first plurality of data packets transmitted to the NIC by the converter. A branch exchange manager is configured to receive the data from the NIC and cause the data to be transmitted over the second telecommunication connection.

8 Claims, 9 Drawing Sheets

BRANCH EXCHANGE METHODS AND APPARATUSES FOR SWITCHING TELECOMMUNICATION SIGNALS

CROSS REFERENCE TO RELATED APPLICATION

This application claims priority to U.S. Provisional Application No. 60/729,580, entitled "Method and Apparatus for Converting Parallel Bit Data into Multi-Port Steered Serial Data Stream," and filed on Oct. 24, 2005, which is incorporated herein by reference.

BACKGROUND OF THE DISCLOSURE

Related Art

A private branch exchange (PBX) typically is used to provide telephony services to a relatively large number of users. For example, a business may use a PBX to provide telephone services to its employees. A primary function of a PBX is to switch signals between various telecommunication connections that are coupled to the PBX. For example, an incoming signal may be switched from one connection to any of a large number of other connections depending on the ultimate destination of the incoming signal. To enhance the telecommunication service provided to users, current PBXs typically provide many optional features such as call transfer, auto attendant, voicemail, call forwarding, automatic ring back, conference call and others.

Historically, implementing a PBX has been expensive and difficult to afford for many small businesses and individuals. However, since the 1990's, there has been an increasing number of "off-the-shelf" solutions, including consumer-grade and consumer-size PBXs. These PBXs are not generally comparable in size, robustness or flexibility to commercial-grade PBXs, but still provide an attractive set of features.

Some proponents of more recent open source projects claim that their initiatives have finally brought PBXs within the reach of even more individuals and small businesses. The mentioned open source projects provide more flexibility and more features (often not needed or understood by average users) on standard hardware platforms, plus the ability to actually inspect and change the inner working of a PBX. They have also opened business opportunities for newcomers to the market of mid-size PBX, since they have lowered the entry barrier for new manufacturers.

Typically, in order for a personal computer (PC) to serve as an element of a PBX, the PC is linked or coupled to telecommunication interface modules. A link should be adaptable so that a variety of telecommunication interface modules can be coupled to the personal computer. Further, a link should provide a full duplex exchange of control information and telecommunication data between the personal computer and the telecommunication interface modules. One component typically included in the link is a conversion circuit (converter). Converters are generally expensive and often have little or no flexibility in providing custom PBX features. Thus, while various solutions permit smaller business and individuals to utilize PBX functionality, many solutions are still quite expensive to upgrade and to expand their functionality.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
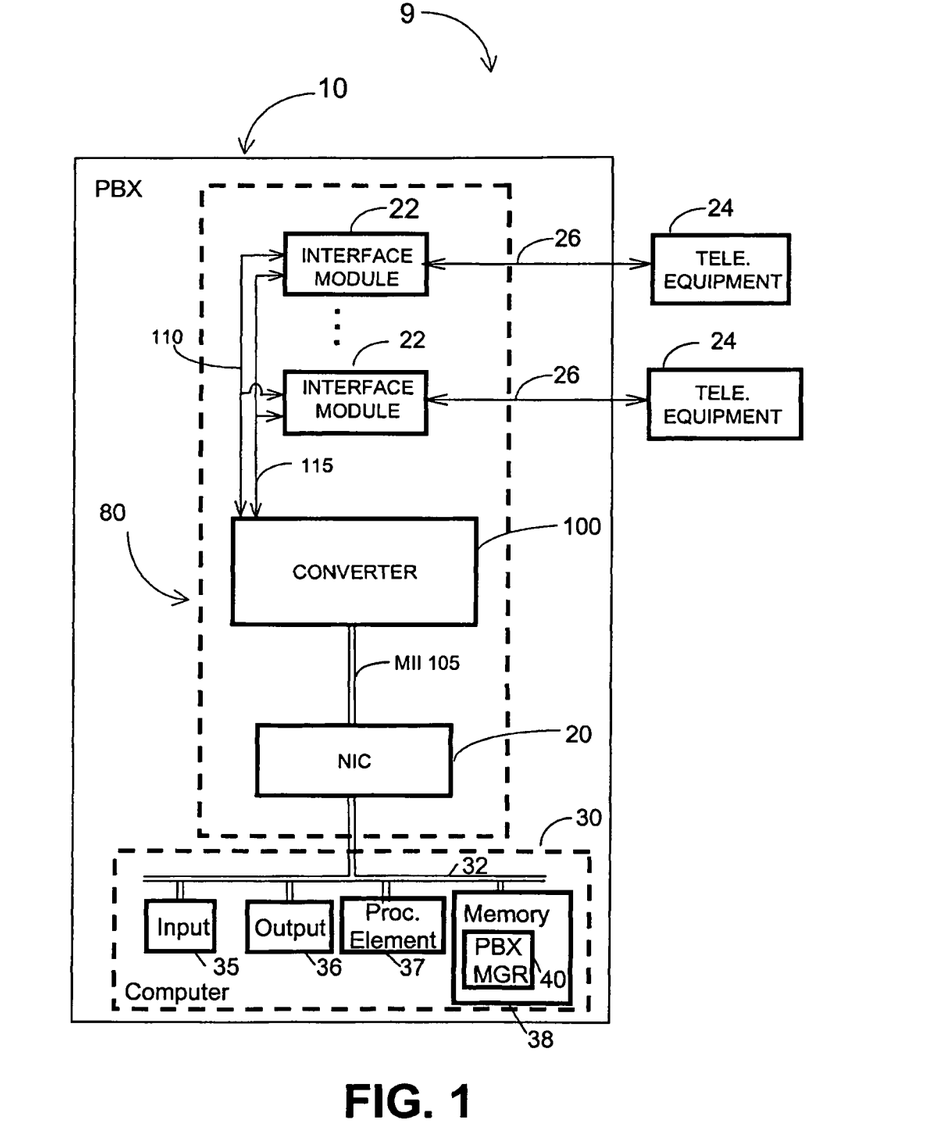
FIG. 1 illustrates an exemplary embodiment of a computer-based private branch exchange in accordance with the present disclosure.

FIG. 1 depicts an exemplary telecommunication system 9 having a private branch exchange (PBX) 10 in accordance with the present disclosure. Note that "private" generally refers to the ownership of a branch exchange. In this regard, branch exchanges owned by private parties are considered to be "private," and branch exchanges owned by telephone companies are considered to be "public." Public branch exchanges are generally larger and more complex than private branch exchanges. The term "branch exchange" shall be used herein to refer to either a private branch exchange or a public branch exchange. Any of the PBX embodiments described herein could be used to implement a public branch exchange, if desired.

The PBX 10 of FIG. 1 comprises a computer (e.g., a personal computer (PC)) 30 that is coupled to a network card 80, as will be described in more detail hereafter. The computer 30 comprises a personal computer interface (PCD bus 32 that enables communication between various elements of the computer 30. As shown by FIG. 1, the PCI bus 32 is coupled to an input interface 35, an output interface 36, a processing element 37, and memory 38. The input interface 35 may include various components, such as a keyboard or mouse, for enabling a user to provide inputs to the computer 30, and the output interface 36 may include various components, such as a printer or display device, for enabling the computer 30 to provide outputs to a user. The processing element 37 may comprise an instruction execution device, such as a central processing unit (CPU), to execute software stored in memory 38.

In the embodiment shown by FIG. 1, a PBX manager 40 is implemented in software and stored in memory 38. The PBX manager 40 controls various aspects of the PBX 10, such as call switching. In other embodiments, it is possible for the PBX manager 40 to be implemented in hardware or a combination of hardware and software. The system card 80 is interfaced with the PCI bus 32, and the PBX manager 40 can communicate with elements of the system card 80 via the PCI bus 32, as will be described in more detail hereafter.

As shown by FIG. 1, the system card 80 has one or more interface modules 22 connected to corresponding telecommunication equipment 24 via a plurality of telecommunication connections 26 (e.g., copper wire pairs or other types of connections). The telecommunication equipment 24 can include various devices, such as telephones, fax machines, modems, switches, routers, etc., and the equipment 24 may be positioned at various locations. For example, some of the equipment 24 may be located at one or more customer premises, such as the customer premises of the PBX 10, and some of the equipment 24 may be located at one or more central offices of a telecommunication network. Further, the signals received by the interface modules 22 can be of various types and formats. For example, one or more of the interface modules 22 may receive T1 signals, ISDN signals, DSL signals, and/or other types of signals. In general, data and information that is transferred from the computer 30 to the interface modules 22 will be referred to as going in the "upstream" direction, and data and information transferred in the opposite direction will be referred to as going in the "downstream" direction.

In one embodiment, a network interface controller (NIC) 20 is coupled to the PCI bus 32. A NIC is a known device for interfacing a PCI bus to a packet network, such as an Internet protocol (IP) network. A NIC typically receives, from a PCI bus or some other interface, data to be transmitted over a packet network and packetizes the data into data packets. The NIC then transmits the packets over an Ethernet connection to the network. The NIC also receives data packets via an Ethernet connection from the packet network and depackitizes the data in order to recover the payload data from the packets. The NIC then transmits the payload data over the PCI bus so that the data can be further processed by components of a computer.

Many NICs have one or more media access controllers (MACs). For example, one exemplary NIC sold by Infineon, Inc. having part number AN983B has a first MAC for controlling full-duplex communication over an Ethernet bus and a second MAC for controlling full-duplex communication over a media independent interface (MII) bus. The first MAC is often used to transmit data packets over an Ethernet connection to a packet network, such as an IP network, and the second MAC, referred to hereafter as the "MII MAC," is often used to transmit data packets to a packet network via another type of protocol. For an embodiment of the disclosure, the MII MAC provides a bus for data transfer within the systems card 80 as will be seen. The MII MAC transmits nibbles of four bits. Moreover, the data transmitted by the MACs complies with current Ethernet standards, including I.E.E.E. 802 standards.

In one embodiment, the aforedescribed NIC sold by Infineon, Inc. is used to implement the NIC 20 shown by FIG. 1. However, in other embodiments, other types of NICs can be used. As will be described in more detail hereafter, the MII MAC of the exemplary NIC 20 described herein is coupled to and used to communicate with a converter 100. In this regard, a bus 105, referred to herein as "MII bus," connects the converter 100 and the NIC 20, and nibbles are communicated between the converter 100 and the NIC 20 over this MII bus 105.

As shown by FIG. 1, another bus 110 connects the converter 100 to each of the interface modules 22. In one exemplary embodiment, the interface modules 22 transmit, to the converter 100, data received from the telecommunication equipment 24. The data received by the converter 100 is time division multiplexed (TDM). As an example, a plurality of the interface modules 22 may respectively receive T1 signals from the telecommunication equipment 24 and transmit the data from such T1 signals in a TDM fashion to the converter 100. Control information pertaining to the TDM data is transmitted over a bus 115, referred to as a serial peripheral interface (SPI) bus.

The converter 100 converts the serial TDM data stream from interface modules 22 to a parallel data stream for transmission to the NIC 20. The converter 100 also packetizes the data into packets having a format compatible with the NIC 20 so that the NIC 20 will accept and further process the data. Moreover, the data from the TDM data stream transmitted by the interface modules 22 define the payload data of the packets transmitted to the NIC 20 over the MII bus 105.

The NIC 20 depacketizes the data packets from the converter 100 to recover the payload data (i.e., the data from the TDM data stream transmitted by the interface modules 22) and transmits this data over the PCI bus 32 to the PBX manager 40, which processes the data. For example, the PBX manager 40 may provide a switching function by causing a set of data received from one telecommunication connection 26 to be transmitted over another of the telecommunication connections 26.

Moreover, when the PBX manager 40 determines that a set of data is to be transmitted over one of the connections 26, the manager 40 transmits the data to the NIC 20 via the PCI bus 32. The NIC 20 packetizes the data into one or more data packets, and transmits the data packets over the MII bus 105 to the converter 100, which depacketizes the packets to recover the originally transmitted data. Note that it is unnecessary for the converter 100 to store the header portion of the packets. In this regard, the portions of the data packet other than the payload data can be immediately discarded upon receipt. The converter 100 then transmits the payload data over the TDM bus 110, in a TDM fashion, to the appropriate interface module 22 such that the data is communicated over the appropriate connection 26.

It should be noted that the NIC 20, in the instant embodiment, is a standard off-the-shelf component, which is used in conventional applications for interfacing data from a PCI bus to a packet network. Accordingly, the NIC 20 is widely used in a variety of other applications and can be obtained at a relatively low cost. Moreover, by implementing the converter 100, the NIC 20 can be used within the PBX 10 to process the data communicated via TDM data streams to and from the interface modules 22. In one embodiment, the converter 100 is implemented via a programmable logic device, such as a field programmable gate array (FPGA) or other like device, which can be implemented at a relatively low cost. Indeed, the overall cost of the PBX 10 relative to conventional PBXs that provide comparable services can be low. Note that the converter 100 can be implemented in hardware, software, or a combination thereof.

In an embodiment that uses the aforedescribed NIC from Infineon, Inc. or other similar NIC, the NIC 20 has characteristics provided by the manufacturer that comply with Ethernet standards. Accordingly, packets entering and leaving the NIC 20 should comply with a specified frame structure including the Ethernet standard's defined header structure and a FCS (Frame Check Sequence) at the end of the packet so that the NIC receives and processes the packet. In this regard, received packets that do not comply with the standard or the FCS are discarded by the NIC 20.

Note that, since the packets are not actually being interfaced with a packet network, at least some of the header information, such as information that would normally be used for routing the packets over a packet network, can be dummied. As an example, a data packet transmitted over a packet network normally has a source address identifying the device that originally transmitted the packet and a destination address identifying the device that is to ultimately receive the packet. Such information can be dummied by the converter 100 for packets being transmitted to the NIC 20. In this regard, an arbitrary or predefined pattern of bits may be used to define dummied information in the header provided that the selected pattern of bits results in a packet that is recognized as valid by the NIC 20, depending on the NIC 20 that is being used. The same dummy information can be used for each packet, or different dummy information can be used for different packets. However, regardless of what information is used for the header, the FCS should be appropriately defined such that the NIC 20 does not discard the packet based on the FCS. Alternatively, the NIC 20 can be configured to accept a packet in spite of a bad FCS. Moreover, inserting dummy data, such as fake addresses and other information, into the header may be desirable in order for the NIC 20 to accept the packet as a valid packet and prevent the NIC 20 from discarding the packet.

Further, it is unnecessary for the converter 100 to process the data from the interface modules 22 as data packets except for transmission to the NIC 20. In this regard, since the header contains dummy information and is not actually used to route the packet over a packet network, it is unnecessary for the converter 100 to keep the data correlated with any particular header in the memory of the converter 100. Moreover, the converter 100 can simply transmit header information and payload information in the proper sequence so that the transmission is recognized as a valid data packet by the NIC 20 without storing the header information and the payload information as a packet in the converter 100. Indeed, as described above, the same header information may be used for multiple packets being transmitted provided that the FCS of each packet is appropriately defined so that the data being transmitted is not rejected or discarded by the NIC 20.

In addition, NICs are typically configured to include header information in each packet, and some of this header information may be dummied as well. For example, the NIC 20 may be provided with fake or dummy header information, such as a fake source address, a fake destination address, etc. that the NIC 20 includes in the packets being transmitted to the converter 100. The dummy information may be provided by the PBX manager 40 or some other source. The fake header information is preferably discarded by the converter 100.

In one exemplary embodiment, the NIC 20 is located close (e.g., a few inches) to the PCI bus 32, as well as the converter 100. Indeed, each of the components 20, 105, and 22 may be formed on a single printed circuit board (PCB) that is interfaced with the PCI bus 32, and all of such components may be located within inches of each other, although it is possible for such components to be formed on multiple PCBs and located at other distances, if desired. Transmission errors at such short distances are unlikely. Accordingly, in some embodiments, the converter 100 does not actually use the FCS at the end of a received packet to perform error checking.

A packet that is generated in the NIC 20 is transmitted over the MII bus 32 to the converter 100 in a plurality of nibbles of four bits, although other numbers of bits may be transmitted over bus 32 in other embodiments. When the converter 100 receives the nibbles from the MII bus 105, the converter 100 discards the non-payload data, such as the header information and the FCS information, and generates sequences of bytes representing the payload data of the received packets (i.e., the data to be transmitted over one or more telecommunication connections 26).

Figure 2:
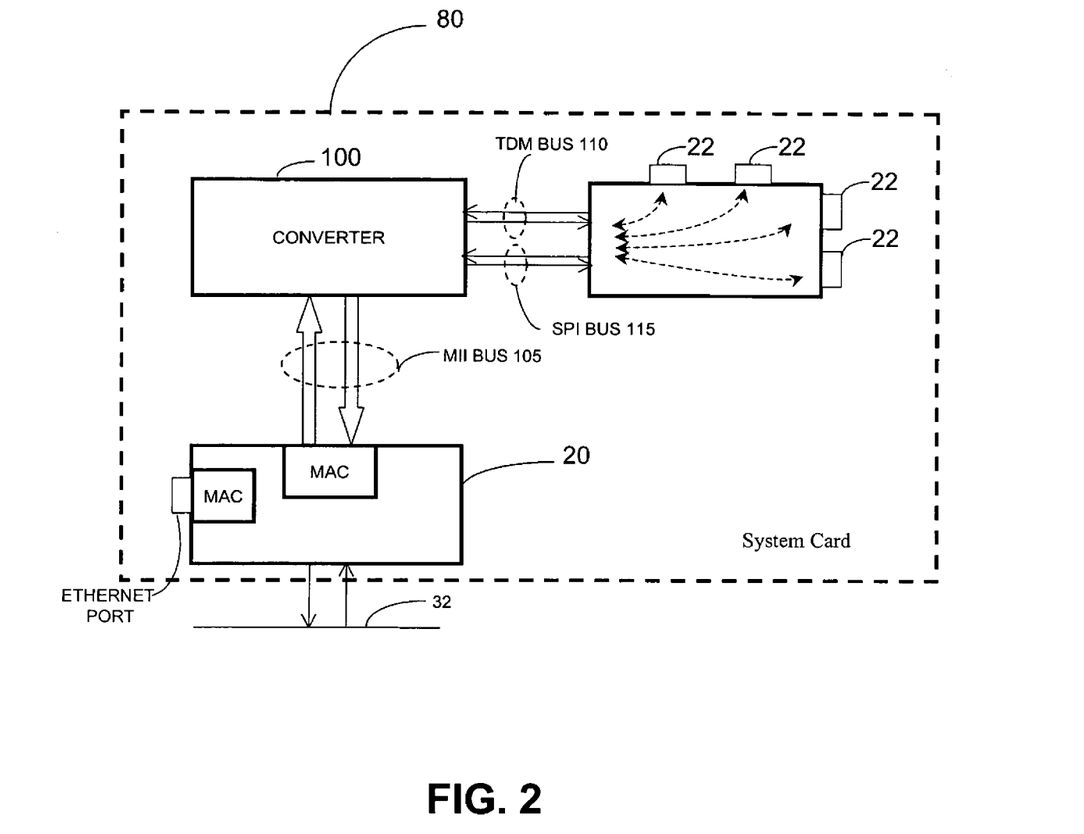
FIG. 2 illustrates an exemplary embodiment of a system card depicted in FIG. 1.

FIG. 2 shows the system card 80 in more detail. The NIC 20 is coupled to the PCI bus 32 of the computer 30. Data flows over the MII bus 105 as nibbles (4-bits in each direction). The TDM bus 110 transports telecommunication data in both directions. For example, the bus 110 can comprise one connection for transmitting a serial TDM data stream from the converter 100 to each interface module 22, and the bus 110 can comprise another connection for transmitting a serial TDM data stream containing data from each of the interface modules 22. The bus 110 can comprise two other connections (not specifically shown) for a clock signal and a frame synch signal.

The SPI bus 115 transports control information in both directions. For example, the SPI bus 115 may transmit a chip select signal indicating when each interface module 22 is receiving valid data from the TDM bus 110 (i.e., data that the respective interface module 22 is to transmit via one or more telecommunication connections 26 coupled to it). In one embodiment, the data rate for the TDM bus 110 is around 1.544 megabits per second, although other data rates are possible. Control data is generally transported at a slower rate, such as for example, around several hundred bits per second or more.

Figure 3:
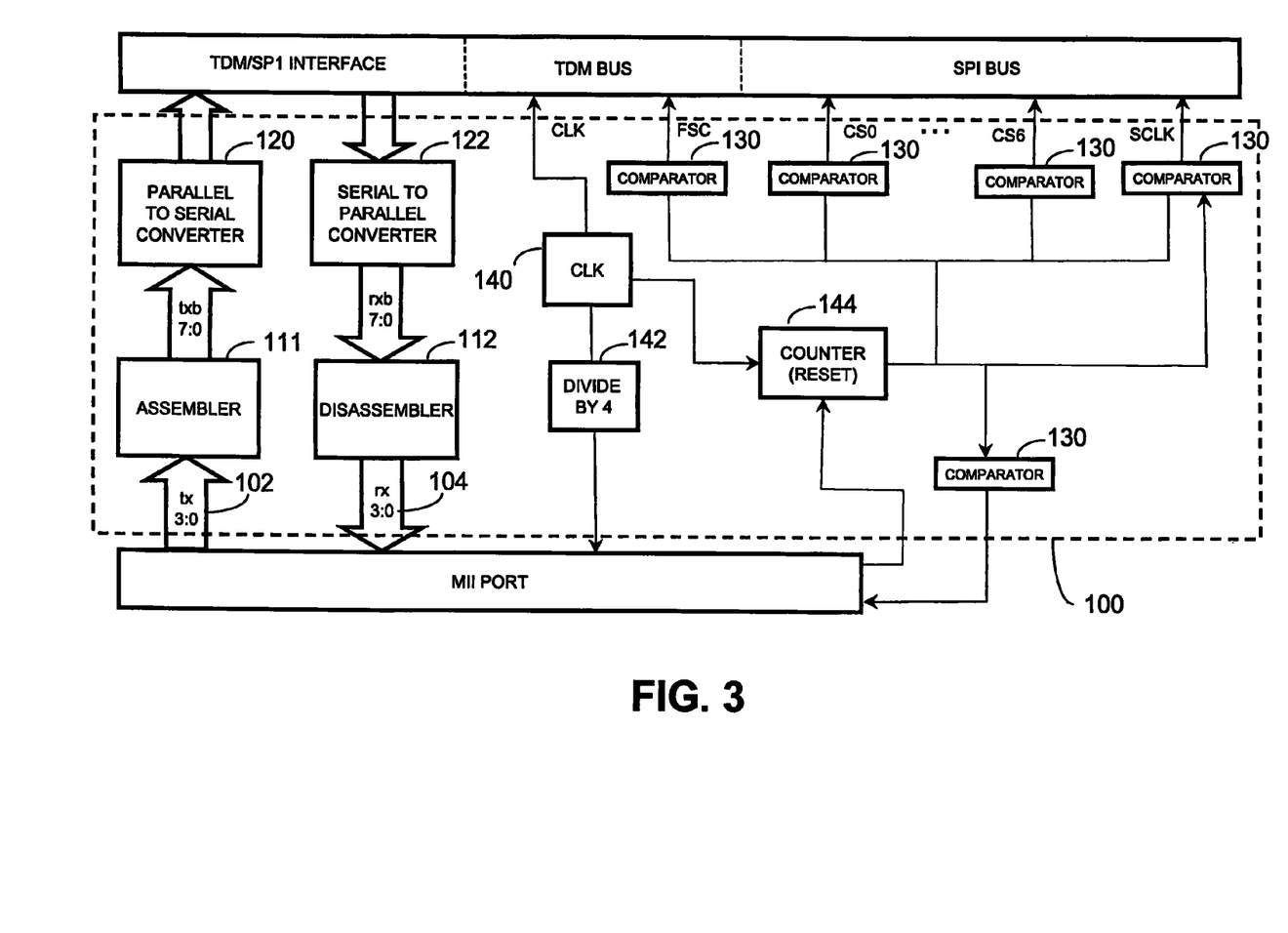
FIG. 3 illustrates an exemplary embodiment of a converter depicted in FIG. 2.

FIG. 3 depicts an exemplary embodiment of the converter 100. The MII bus 105 is shown connected to a downstream side of the converter 100. The TDM bus 110 and the SPI bus 115 are connected to an upstream side of the converter 100. Data flow 102 from the NIC 20 to the assembler 111 is referred to as tx 3:0 on FIG. 3. The term 3:0 means there are 4 bits numbered, for example, as b0, b1, b2 and b3, that are transmitted from the NIC 20 to the converter 100. In one embodiment, the nibbles are placed in reverse order before assembling the upstream bytes. In this regard, different NICs may transmit bits differently. For example, one NIC might transmit the most significant bit (MSB) to the least significant bit (LSB) in a left-to-right fashion, and another NIC might transmit the MSB to the LSB in an opposite fashion (i.e., right-to-left fashion). Thus, depending on the manner that the NIC 20 transmits the nibbles, it may be desirable to reverse the order of the bits.

In addition to reversing the bits, if appropriate, the assembler 111 depacketizes the frame by discarding non-payload information, such as the header information and checksum information. The upstream data retrieved from the frame, via depacketization, is converted by parallel to serial converter 120 to a serial data stream and placed on the TDM bus 110. Data flow 104 received by the NIC 20 and from the disassembler 112 is referred to as rx 3:0. Data on the MII bus 105, the TDM bus 110 and the SPI bus 115 are transferred as described in the corresponding timing diagrams of FIGS. 4, 5, and 6.

Downstream serial data from the TDM bus 110 and the SPI bus 115 are converted to downstream bytes by serial to parallel converter 122. The downstream bytes form the payload for the frame generated in disassembler 112. The downstream frame has a valid header and FCS appended to the end of the frame. The downstream frame is then separated into nibbles, having bit reversal, if appropriate, and sent downstream over the MII bus 105. The NIC 20, not shown in FIG. 3, then converts the nibbles to a frame for coupling over the PCI bus of the computer 30.

In one embodiment, a clock 140 is a timing source for the TDM clock signal, the SPI clock signal, and the MII clock signal. The SPI clock signal is generated using a counter 144 that is reset, and the MII clock signal is generated by using a divide by 4 device 142. A variety of clock generation devices and methods may be used to ensure that data is read at the appropriate time. Such devices and methods would be understood by one of ordinary skill in the art upon reading this disclosure.

A counter 144 counts from a start value (e.g., 0) and continues counting until an end value is attained. When the end value is attained the counter resets the start value again and the counting action continues. Comparators 130 receive count values from the counter 144. Each comparator 130 has a respective first count value and second count value. In general, count values are different for each respective comparator 130. When a count value from the counter 144 reaches the first count value, comparator output transitions from a deasserted state to an asserted state. As the count from the counter 144 continues and reaches the second count value, the output from the comparator 130 returns to the deasserted state. Hence, the first and second count values of comparator 130 are used to generate a chip select signal, such as, for example, CS0 as shown on the timing diagram of FIG. 5. Another comparator 130 having a first count value and a second count value generates a sync pulse, FSC, for the TDM bus as shown in FIG. 6. Similarly, a first and second comparator 130 generates a transmit enable signal, TXEN, and a receive enable signal, RXDV for the MII bus as shown in the timing diagram of FIG. 4 and described below.

Figure 4:
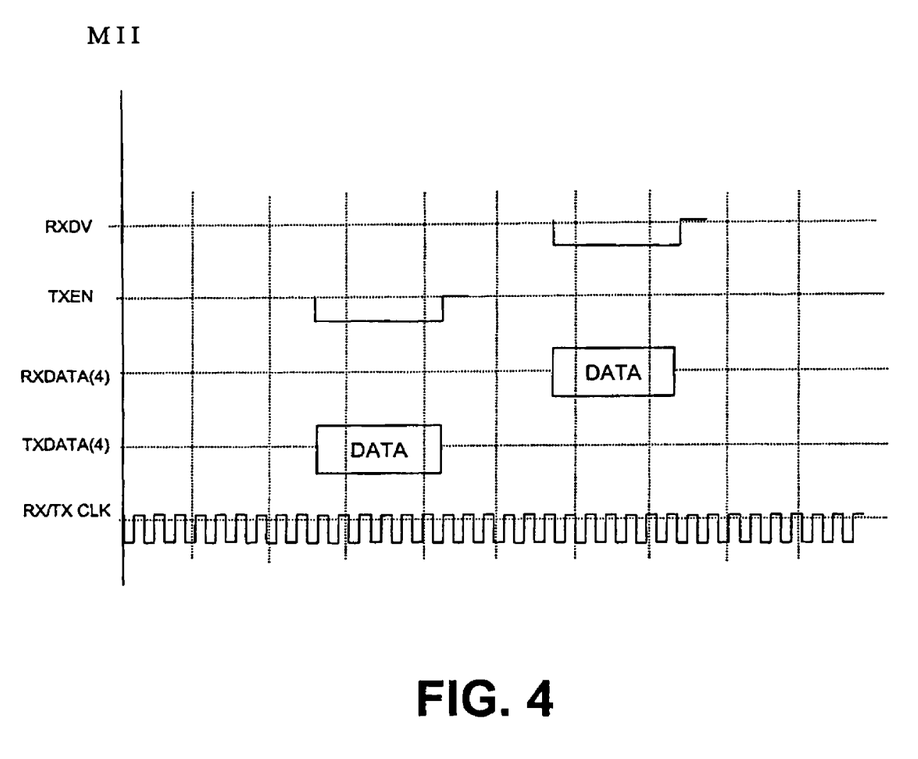
FIG. 4 illustrates an exemplary timing diagram for a data interface for the converter of FIG. 2.

FIG. 4 illustrates an exemplary timing diagram for the MII bus 105. Transmit data, TXDATA(4), going from the NIC 20 to the converter 100 is transferred when TXEN is low. RXDATA(4) going from converter 100 to NIC 20, is transferred when RXDV is low. The clock for the NIC 20 may run at a rate of around 25 MHz allowing for data transfer of up to 100 megabits per second, although other rates are possible in other embodiments.

Figure 5:
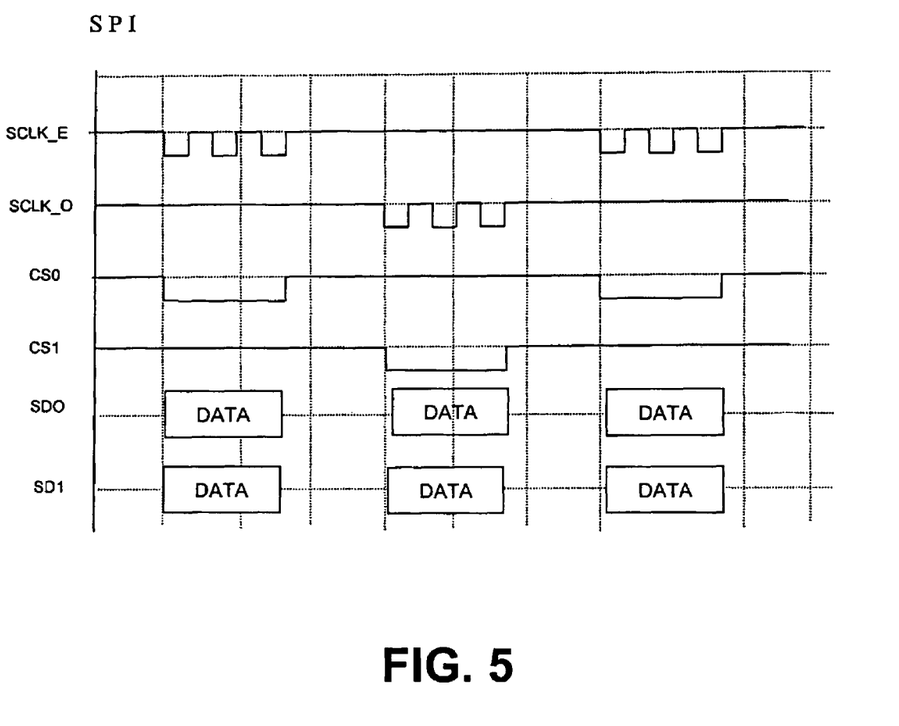
FIG. 5 illustrates an exemplary timing diagram for another data interface for the converter of FIG. 2.
Figure 6:
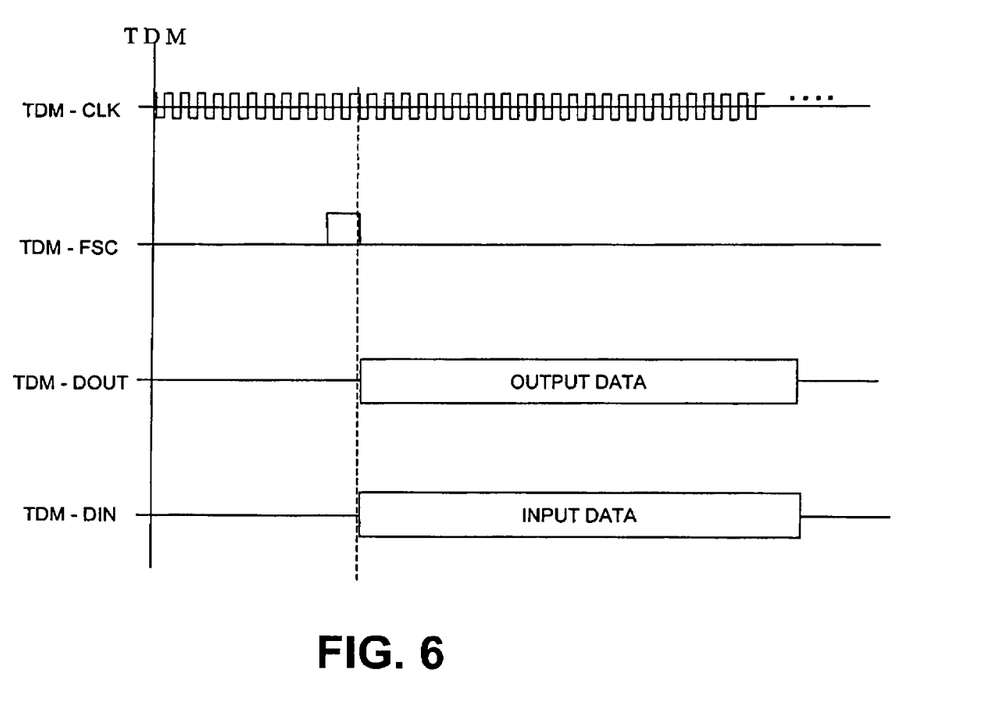
FIG. 6 illustrates an exemplary timing diagram for yet another data interface for the converter of FIG. 2.

FIG. 5 illustrates a timing diagram for the SPI bus 115. In one embodiment, an even clock SCLK_E and an odd SCLK_O is provided allowing for transfer of control information to up to 6 interface modules 22, although other numbers of interface modules 22 are possible in other embodiments. In the illustrated timing example, only a first chip select signal, CS0, and a second chip select signal, CS1 are shown. In other embodiments, there may be additional chip select signals. Output data, SDO, is directed from an interface chip 22 to the converter 100. Input data, SDI, is directed from the converter 100 to an interface chip 22. The CS0 signal allows interface chip 22-0 to send and receive data. The CS1 signal allows the interface chip 22-1 to send and receive data.

An exemplary TDM timing diagram is shown in FIG. 6. A frame sync, FSC, is used in sending and receiving TDM data. Output data is data going in the downstream direction, and input data is data going in the upstream direction. In one embodiment, TDM data is provided as T1 frames and thereby can provide up to 24 phone channels to a central office. The 24 phone channels can provide service to 24 or more phones (or other types of telephony equipment) at the premises of the computer-based PBX 10.

Figure 7:
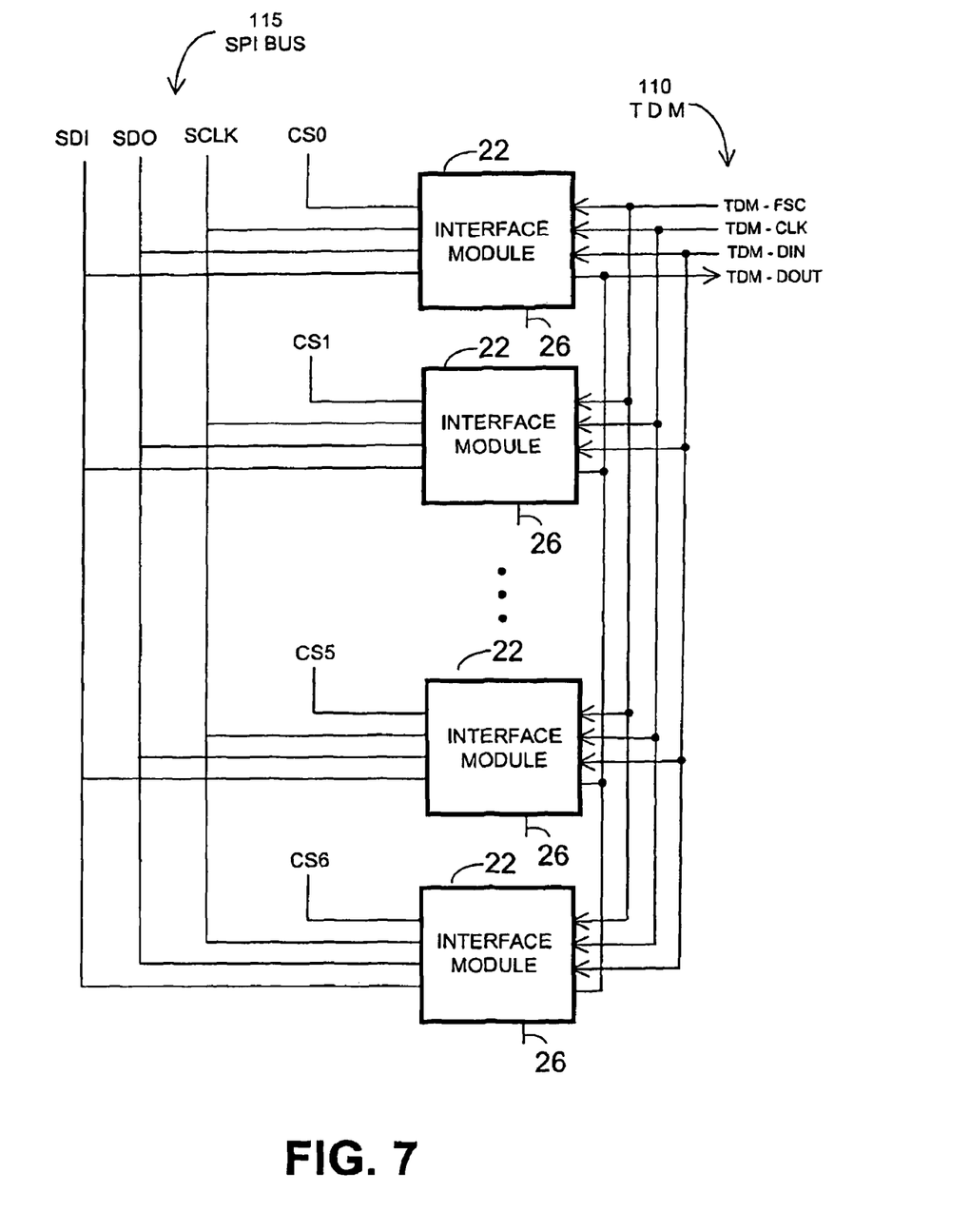
FIG. 7 illustrates an exemplary control bus and telecommunication bus for the converter of FIG. 2.

FIG. 7 illustrates an arrangement of interface modules 22 coupled to the SPI bus 115 and the TDM bus 110. Each module 22 has a SPI bus port connected to four connections, and a TDM bus port connected to four connections. Control information over the SPI bus 115 is transferred as input data, SDI, and output data, SDO. The interface module 22 transfers data when it receives a CSi signal and an SCLK signal.

Figure 8:
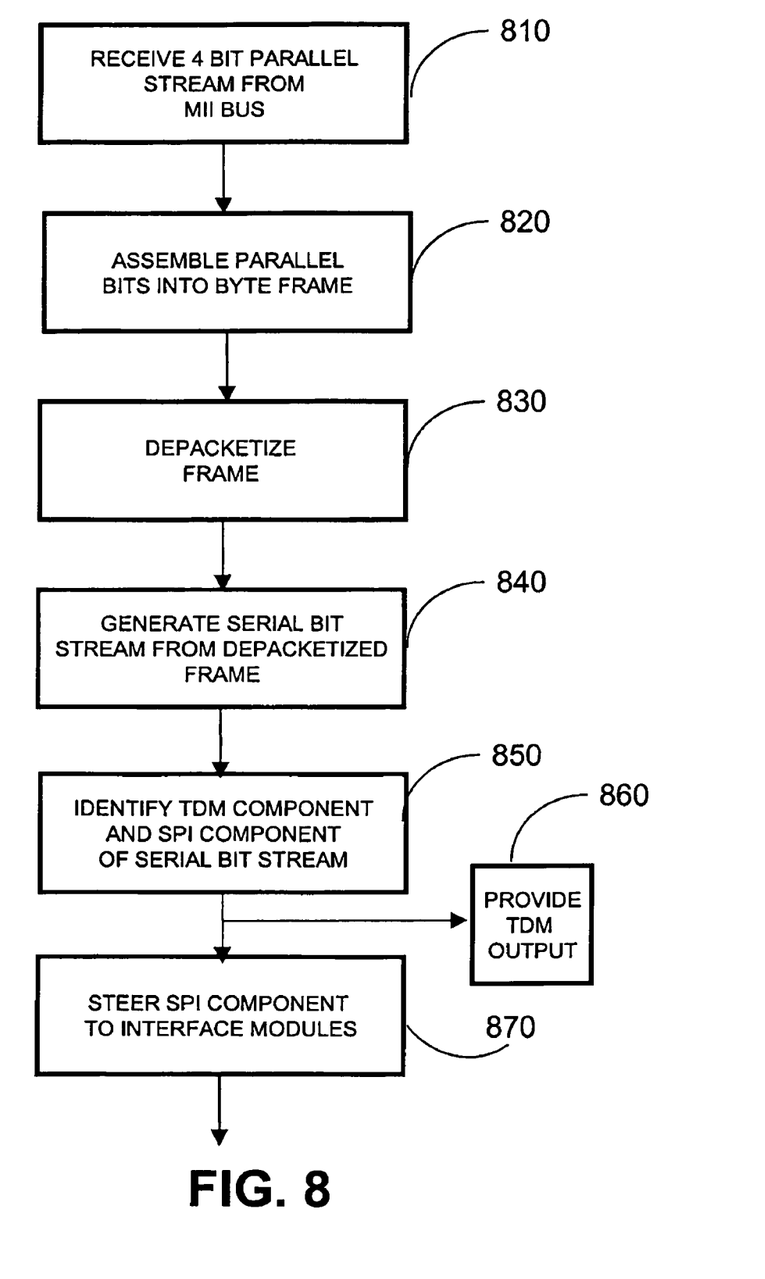
FIG. 8 illustrates an exemplary method implemented by the converter of FIG. 2 for processing data received from a network interface controller (NIC).

An exemplary method for processing upstream data is shown in FIG. 8. The NIC 20 provides a nibble (a 4-bit parallel data stream) that is received by the converter 100, step 810. The converter 100 arranges the nibbles into bytes and forms a frame comprised of bytes, step 820. The bytes forming the frame have header bytes and FCS bytes appended to the ends of the frame. In order to acquire the data within the frame, the header bytes and FCS bytes are removed, in step 830 of depacketizing the frame. A serial bit stream is generated from the data bytes, step 840, using a parallel to serial converter. Next, the TDM component of the serial stream and the SPI component of the serial frame are identified, step 850. The SPI component is steered to the interface modules 22 to direct the actions of the module, step 870. The TDM component is provided, step 870, and processed by the interface module 22 and transferred to the corresponding telecommunication equipment 24 associated with the interface module 22.

Figure 9:
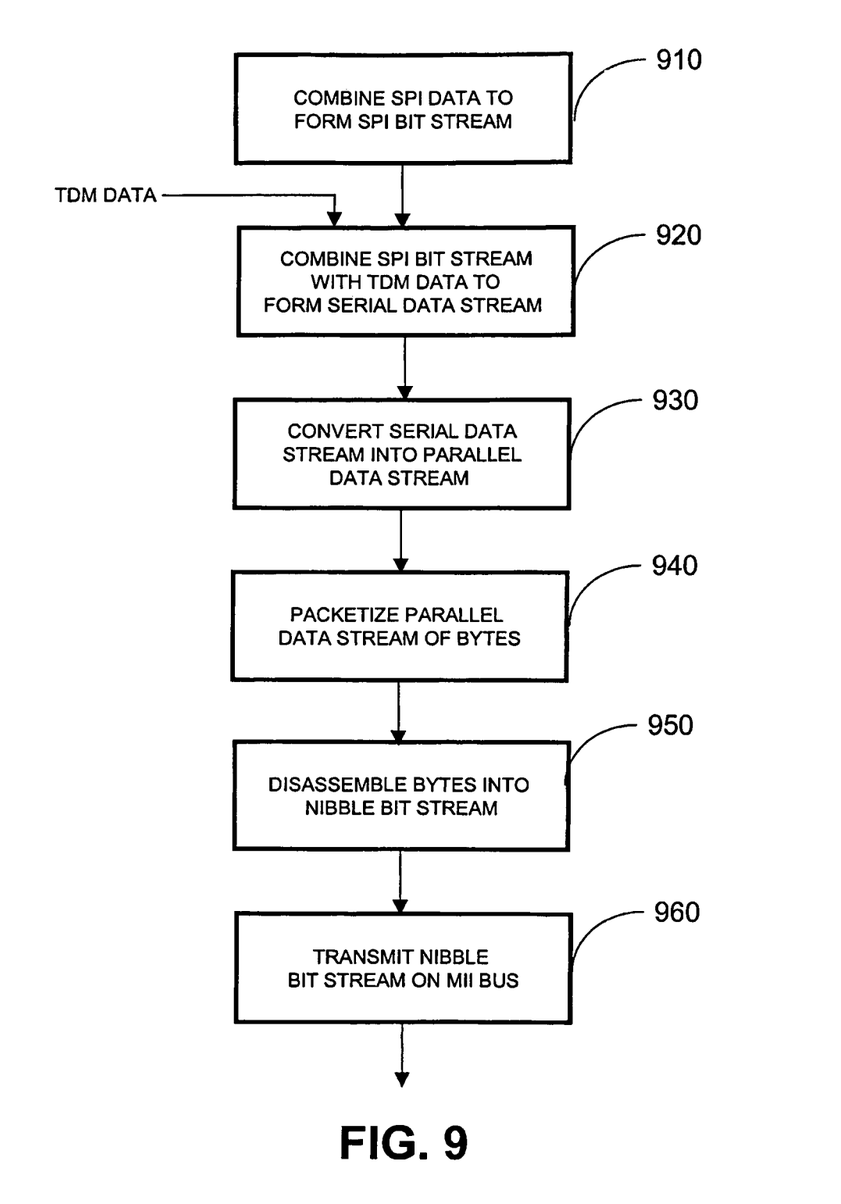
FIG. 9 illustrates an exemplary method implemented by the converter of FIG. 2 for processing data received from a network interface controller (NIC).

FIG. 9 depicts an exemplary method 900 for processing downstream data. Step 910 comprises the action of combining SPI data from interface modules 22 to form a SPI serial bit stream. The SPI serial bit stream is then combined with TDM data to form a downstream serial stream, step 920. The downstream serial stream is converted into bytes using a serial to parallel converter, step 930. The converted data bytes have framing information, a header and a FCS appended thereto to form a valid frame, indicated by packetizing step 940. The frame is then separated into nibbles, step 950, for coupling to the MII bus. The nibbles are then transmitted, step 960, from the converter 100. The nibbles are received by the NIC 20 and subsequently coupled over a PCI bus of the computer 30.

The converter 100 of the present disclosure may be implemented in a variety of logic devices. A combination of logic devices and processors may also provide the functions of the converter 100.

Embodiments have been generally described above as transmitting TDM signals between converter 100 and interface modules 22 and as transmitting MII signals between converter 100 and NIC 20. In other embodiments, other types of formats can be used to communicated with the converter 100. As a mere example, RMI, GPSI, or some other protocol could be used to communicate between the NIC 20 and the converter 100.

In various embodiments described above, the PBX manager 40 is described as being implemented in a computer and as communicating with the NIC 20 over a PCI bus 32. However, other configurations are possible, and other types of buses, such as Firewire, universal serial bus (USB), and local bus, may be used to communicate between the NIC 20 and the PBX manager 40 in addition to or in lieu of the PCI bus 32. The NIC 20 may be implemented in software, hardware, or a combination thereof.

It should be understood that the above-described embodiments of the present invention are merely possible examples of implementations that have been set forth for a clear understanding of the principles of the disclosure. Many variations and modifications may be made to the above-described embodiments without departing. substantially from the spirit and principles of the disclosure. All such modifications and variations are intended to be included herein within the scope of this disclosure and protected by the following claims.

Now, therefore, the following is claimed:

1. A branch exchange, comprising:
    at least one interface module coupled to a plurality of telecommunication connections including a first telecommunication connection and a second telecommunication connection;
    a network interface controller (NIC) that processes at least one time division multiplexed (TDM) data stream within the branch exchange;
    a converter coupled to the at least one interface module and the NIC, the converter configured to communicate the TDM data stream along with control information pertaining to the TDM data stream in a combined serial data stream prior to transmission to the NIC, between the converter and the at least one interface module, the converter further configured to packetize data from one of the telecommunication connections into a first plurality of data packets transmitted to the NIC by the converter; and a branch exchange manager configured to receive the data from the NIC and cause the data to be transmitted over the second telecommunication connection.

2. The branch exchange of claim 1, wherein the NIC, the converter and the at least one interface module reside on a system card interfaced with a computer.

3. The branch exchange of claim 1, wherein the branch exchange manager is configured to transmit the data to the NIC, wherein the NIC is configured to packetize the data into a second plurality of data packet and to transmit the second plurality of data packets to the converter, and wherein the converter is configured to depacketized the second plurality of packets and to transmit the data to one of the interface modules.

4. The branch exchange of claim 1, further comprising a personal computer interface (PCI) bus interfaced with the NIC, wherein the NIC is configured to transmit the TDM data stream over the PCI bus for access by the branch exchange manager.

5. A method for use in a branch exchange that is coupled to a first telecommunication connection and a second telecommunication connection, comprising:

step for receiving data from the first telecommunication connection;

step for transmitting the data via a time division multiplexed (TDM) data stream;

step for transmitting control information pertaining to the TDM data stream;

step for converting the TDM data stream along with the control information pertaining to the TDM data stream in a combined serial data stream, into a first plurality of data packets transmitted, in parallel, to a network interface controller (NIC), where the data packets include dummy information in a header of the data packet that allows the NIC to accept the data packet that would otherwise be discarded due to a bad frame check sequence of the data packet;

step for depacketizing, via the NIC, the first plurality of data packets thereby recovering the received data; and step for causing the data to be communicated over the second communication connection.

6. The method of claim 5, wherein the causing step comprises the step of transmitting the data to the NIC, the method further comprising:

step for packetizing, via the NIC, the data into a second plurality of data packets transmitted, in parallel, from the NIC; and step for converting the second plurality of data packets into a TDM data stream.

7. The method of claim 5, wherein the NIC is interfaced with a personal computer interface (PCI) bus.

8. A branch exchange that is coupled to a first telecommunication connection and a second telecommunication connection, comprising:

means for receiving data from the first telecommunication connection and for transmitting the data via a time division multiplexed (TDM) data stream;

means for receiving control information pertaining to the TDM data stream;

means for converting the data TDM stream along with the control information pertaining to the TDM data stream in a combined serial data stream into a first plurality of data packets;

a network interface controller (NIC) that processes the TDM data stream within the branch exchange, the NIC coupled to the converting means, the NIC configured to receive, in parallel, the first plurality of data packets from the converting means, the NIC configured to depacketize the first plurality of data packets thereby recovering the received data; and means for transmitting the TDM data stream from the NIC over a personal computer interface (PCI) bus to the second communication connection.

* * * * *